US008406740B2

(12) United States Patent
Kamal et al.

(10) Patent No.: US 8,406,740 B2
(45) Date of Patent: Mar. 26, 2013

(54) COMPUTERIZED SYSTEM AND METHOD OF RECORDING COMMUNICATIONS BETWEEN PARTIES USING TELECOMMUNICATIONS DEVICES

(75) Inventors: J. Robert Kamal, Brighton, MI (US); Peter Bainbridge-Clayton, Mark Cross (GB)

(73) Assignee: Kohorts IT Services, LLC, Brighton, MI (US)

( * ) Notice: Subject to any disclaimer, the term of this patent is extended or adjusted under 35 U.S.C. 154(b) by 0 days.

(21) Appl. No.: 12/987,490

(22) Filed: Jan. 10, 2011

(65) Prior Publication Data

US 2011/0171935 A1 Jul. 14, 2011

Related U.S. Application Data

(60) Provisional application No. 61/293,407, filed on Jan. 8, 2010.

(51) Int. Cl.
*H04L 12/58* (2006.01)
(52) U.S. Cl. .............. 455/412.1; 455/419; 455/418
(58) Field of Classification Search ............. 455/412.1, 455/419, 418
See application file for complete search history.

(56) References Cited

U.S. PATENT DOCUMENTS

| 5,884,193 | A | 3/1999 | Kaplan |
| 6,871,082 | B2 | 3/2005 | Cox et al. |
| 6,987,841 | B1 * | 1/2006 | Byers et al. ............... 379/88.17 |
| 7,039,425 | B1 | 5/2006 | Mazawa et al. |
| 7,428,585 | B1 | 9/2008 | Owens, II et al. |
| 7,437,772 | B1 | 10/2008 | Thenthiruperai et al. |
| 7,516,219 | B2 | 4/2009 | Moghaddam et al. |
| 7,646,859 | B2 | 1/2010 | Crandell et al. |
| 7,647,047 | B2 | 1/2010 | Moghaddam et al. |
| 7,653,417 | B2 | 1/2010 | Morota et al. |
| 2001/0016491 | A1 | 8/2001 | Imura et al. |
| 2002/0160751 | A1 | 10/2002 | Sun et al. |
| 2003/0200308 | A1 | 10/2003 | Tameda et al. |
| 2005/0047571 | A1 | 3/2005 | Crandell et al. |
| 2006/0293057 | A1 | 12/2006 | Mazerski et al. |
| 2007/0211876 | A1 * | 9/2007 | Othmer et al. ............. 379/201.01 |
| 2008/0020803 | A1 | 1/2008 | Rios et al. |
| 2008/0146259 | A1 | 6/2008 | Chin et al. |
| 2008/0267363 | A1 * | 10/2008 | Pickett ............................ 379/85 |
| 2008/0293396 | A1 * | 11/2008 | Barnes et al. ................. 455/418 |
| 2009/0029674 | A1 | 1/2009 | Brezina et al. |
| 2009/0132655 | A1 | 5/2009 | Behrens |
| 2011/0117886 | A1 * | 5/2011 | Travis et al. ............... 455/412.2 |

FOREIGN PATENT DOCUMENTS

| GB | 2389737 A | 12/2003 |
| GB | 2456754 A | 7/2009 |

* cited by examiner

*Primary Examiner* — Kwasi Karikari

(57) ABSTRACT

A computerized system of recording communications between a first party and a second party automatically notifies the second party to the recording of the communication. A request is received at a first telecommunications device, utilized by the first party, to initiate the communications between the parties, either by receiving or placing a call or text message. A unique identifier identifying a second communications device, utilized by the second party, is received by the first telecommunications device. A warning message is then automatically sent to the second communications device that the communications are being recorded. The communications between the devices is then recorded.

9 Claims, 4 Drawing Sheets

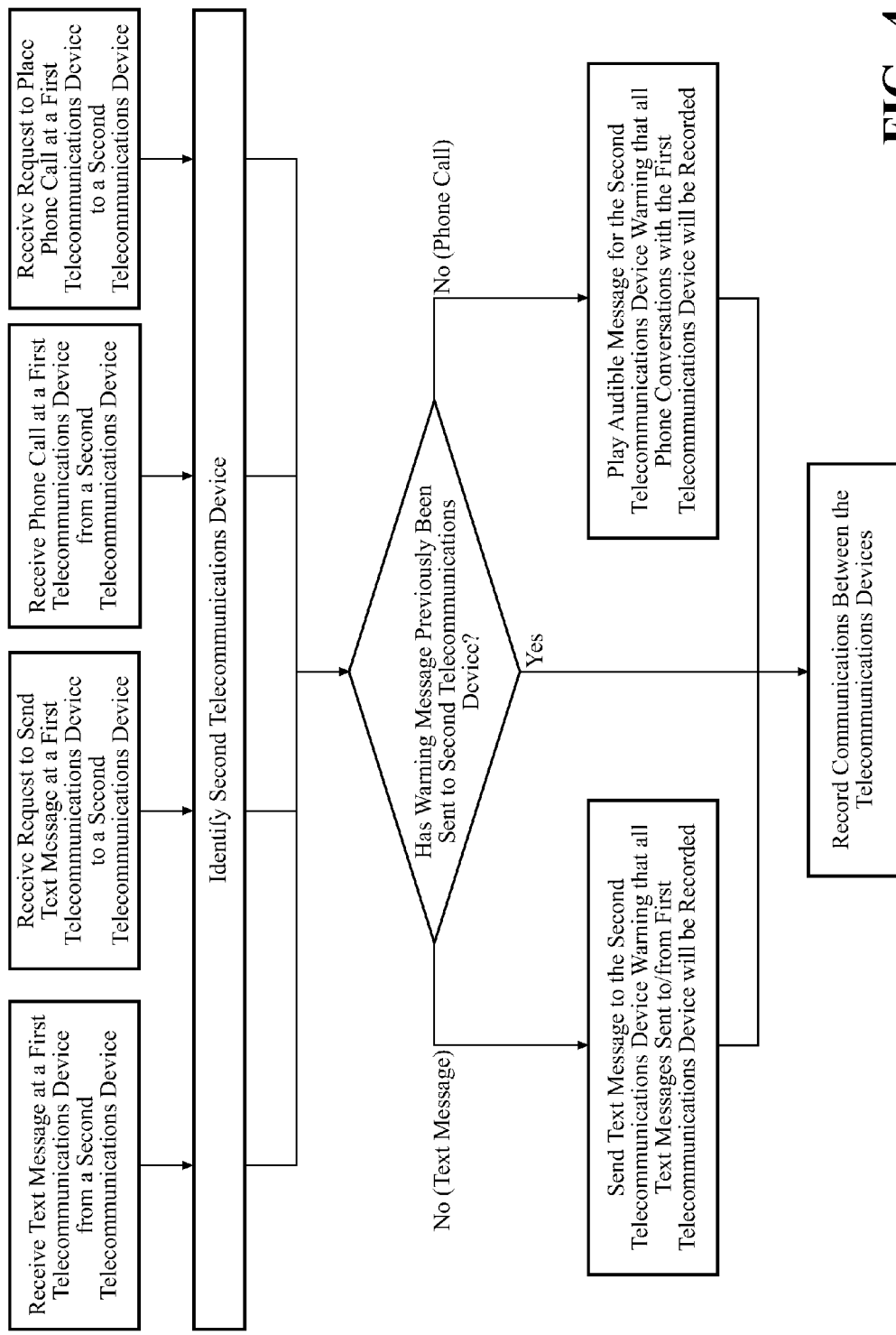

COMPUTERIZED SYSTEM AND METHOD OF RECORDING COMMUNICATIONS BETWEEN PARTIES USING TELECOMMUNICATIONS DEVICES

CROSS REFERENCE TO RELATED APPLICATION

This application claims the benefit of provisional patent application No. 61/293,407, filed Jan. 8, 2010, which is hereby incorporated by reference.

BACKGROUND OF THE INVENTION

1. Field of the Invention

The field of the invention relates generally to monitoring of telecommunications devices.

2. Description of the Related Art

Telecommunications devices, such as cell phones or smart phones, have become commonplace and often necessary fixtures of everyday life. Often these devices are issued by employers to employees for use in carrying on business or to children by parents. As such, monitoring of the usage of such devices is often necessary to ensure that the devices are not being misused and/or to ensure the safety of the user. However, comprehensive monitoring of telecommunications devices, as well as assembling data relating to such monitoring, remains a challenge. Furthermore, the second party to conversations with monitored devices may not be aware that such monitoring is taking place.

Accordingly, the subject application discloses a computerized system and method for addressing these difficulties.

BRIEF SUMMARY AND ADVANTAGES

The application provides a method of recording communications between a first party using a first telecommunications device and a second party utilizing a second telecommunications device and notifies the second party to the recording of the communication. The method includes the step of receiving a request at the first telecommunications device to initiate the communications between the parties. The method further includes the step of receiving an identifier uniquely identifying the second communications device at the first telecommunications device. A warning message is automatically sent to the second communications device that the communications are being recorded in response to receiving the identifier uniquely identifying the second communications device. The method further includes recording the communications between the first and second communications devices.

By providing a warning message to the second communications device, the second party is duly warned that their communications, e.g., text messages and/or telephone conversations, should not be considered private and may be monitored by a third party. Furthermore, automatically providing this warning upon the identification of the second communications device assists in compliance with potential or existing laws and/or regulations governing recording of telecommunications.

BRIEF DESCRIPTION OF THE DRAWINGS

Other advantages of the disclosed subject matter will be readily appreciated, as the same becomes better understood by reference to the following detailed description when considered in connection with the accompanying drawings wherein:

FIG. 4 is a flow chart showing one embodiment of a method for recording communications between the first party and the second party.

DETAILED DESCRIPTION

Figure 1:
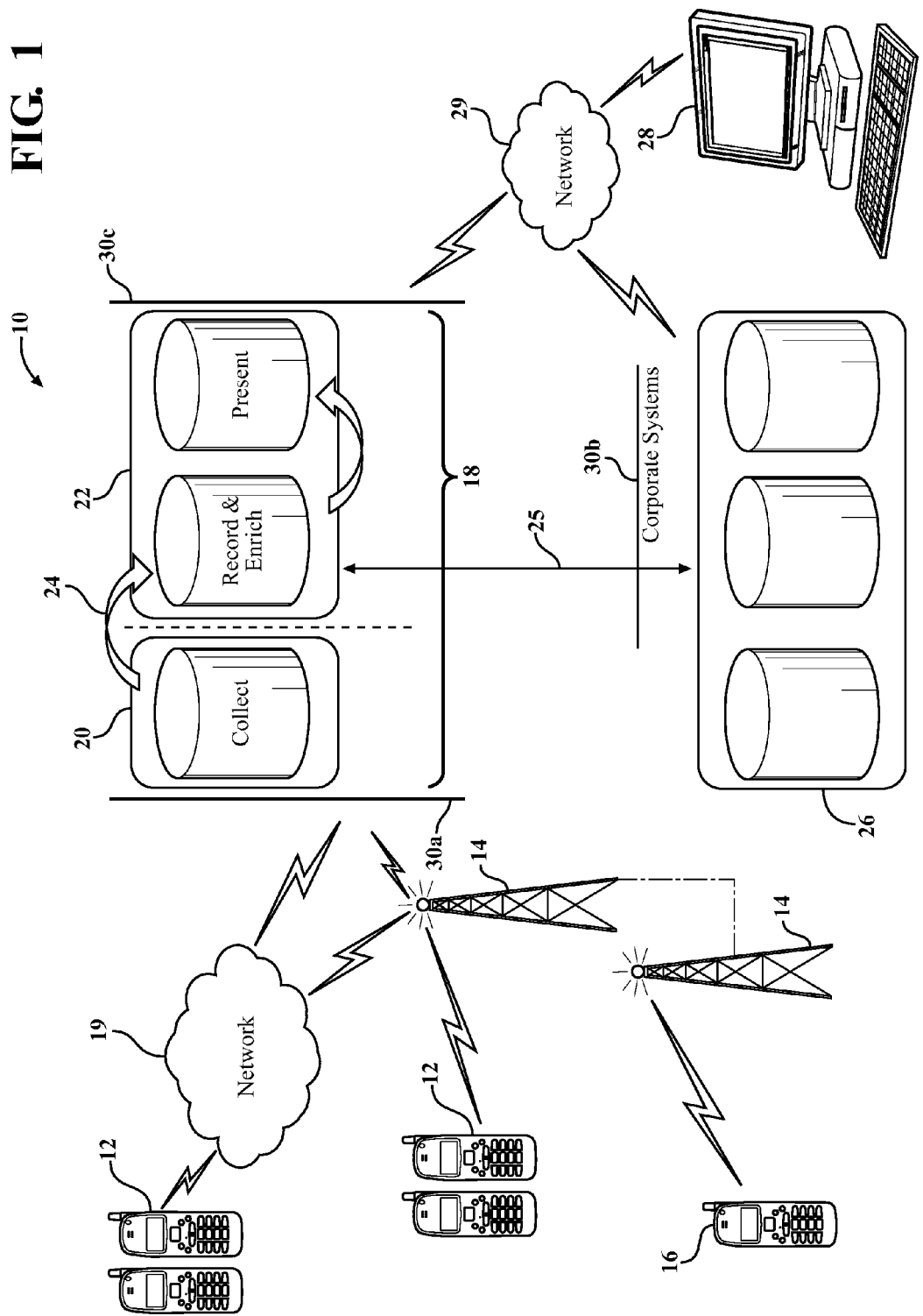
FIG. 1 is a block diagram showing one embodiment of a computerized system for recording communications between a first party and a second party.

Referring to the Figures, wherein like numerals indicate like parts throughout the several views, a method of recording communications between a first party and a second party utilizing a computerized system 10 and notifying at least one of the parties to the recording of the communication utilizing the computerized system 10 is shown herein.

The system 10 includes a first telecommunications device 12 utilized by the first party. The first telecommunications device 12 is capable of sending and/or receiving character-based messages and/or audible conversations. The term "character-based messages" includes, but is not limited to, text messages, such as short message service (SMS) messages. The term "audible conversations" includes, but is not limited to, common and ubiquitous telephone conversation.

The first telecommunications device 12 is preferably a mobile phone (not separately numbered). The mobile phone is often referred to as a cellular phone, cell phone, smart phone, and/or wireless phone, as realized by those skilled in the art. Alternatively, the first telecommunications device 12 may be implemented as other suitable devices, such as a pager, personal computer, laptop, tablet computer, book reader, or other device capable of sending and/or receiving character-based messages and/or audible conversations.

The first telecommunications device 12 preferably has computing capabilities. Specifically, the first telecommunications device 12 includes a processor (not shown). The processor may be a microprocessor, microcontroller, application specific integrated circuit (ASIC) or other device capable of performing numerical calculations and execute software programs as is well known to those skilled in the art.

The first telecommunications device 12 may operate on a mobile phone network 14. The mobile phone network 14 is often referred to as a cellular phone network or cell phone network as well known to those skilled in the art. The first telecommunications device 12 and mobile phone network 14 may utilize any analog and/or digital cellular technology, including, but not limited to, GSM, GPRS, CDMA, EV-DO, EDGE, 3GSM, DECT, TDMA, and iDEN.

Alternatively, the first telecommunications device 12 may communicate via a network 19 such as the Internet. For example, the first telecommunications device 12 may be implemented as an IP phone or a mobile phone having WiFi connectivity. Of course, those skilled in the art will realize other suitable techniques for facilitating communications between the first telecommunications device 12 and other telecommunication devices.

Multiple first telecommunications devices 12 may be utilized by multiple parties and included in the system 10. However, for purposes of readability, typically only one first telecommunications device 12 used by a single first party will be described herein.

In the illustrated embodiment, a software application (not shown) resides on the first telecommunications device and is executed by the processor on the first telecommunications device 12. The application may be loaded onto the first telecommunications device 12 via over-the-air (OTA) techniques or other techniques known to those skilled in the art. The application captures transactional data streams (or simply "transactional data") and transmits these transactional data streams as described in greater detail below. The transactional data may be stored in on-board memory (not separately shown) of the processor or in other data storage devices in communications with the processor.

The second party utilizes a second telecommunications device 16. The second telecommunications device 16 may be a mobile phone, a landline phone, or any other suitable device capable of sending and/or receiving character-based messages and/or audible conversations. Of course, multiple second telecommunications devices 16 may be utilized by multiple parties. However, for purposes of readability, typically only one second telecommunications device 16 will be described herein.

The system 10 of the illustrated embodiment includes a server computer 18 in communication with the first telecommunications device 12. Communications between the server computer 18 and the first telecommunications device 12 may be accomplished via the telecommunications network 14 or another network 19, such as the Internet, as well known to those skilled in the art.

Specifically, the server computer 18 of the illustrated embodiment is implemented as an application server 20 and a data store 22. Of course, multiple server computers 18 with one or more application servers 20 and data stores 22 may alternatively be implemented as realized by those skilled in the art.

In the illustrated embodiment, a monitoring acknowledgement request is sent to the first telecommunications device 12 from the server computer 18 in response to the application being loaded onto the first telecommunications device 12.

This request is typically implemented as a character-based message. The system 10 may require confirmation of receipt of the monitoring acknowledgement request by the first party prior to allowing functionality of the first telecommunications device 12. For example, the request may ask, "do you understand that any use of this device, including all voice conversations and text messages, may be recorded and utilized by others?" The system 10 then requires that a confirmation message be sent back to the server computer 18. For example, the confirmation message may be the word "Yes" or simply the letter "Y".

The software application being executed on the first telecommunications device 12 streams the transactional data from the first telecommunications device 12 to the server computer 18. The data captured by the application on the first telecommunications device 12, and collected by the server computer 18, includes, but is not limited to, call records (both inbound and outbound), text messaging data (inbound/outbound transactions as well as message content), and multimedia messaging data (inbound/outbound transactions as well as message content). Typically, most data traffic is from the first telecommunications device 12 to the server computer 18. However, the download of the software application to the first telecommunications device 12 as well as commands to remotely lock and wipe the first telecommunications device 12 will be sent from the server computer 18 to the first telecommunications device 12.

The "call records" may include data representing all or part of an audible conversation between the first telecommunications device 12 and the second telecommunications device 16. As such, both the first telecommunications device 12 and the server computer 18 a recording component (not separately numbered) for recording the communications between the first and second parties.

In the illustrated embodiment, the application server 20 receives the transmissions of the transactional data from the first telecommunications device 12 and aggregates this transactional data into flat files. These flat files are then collected and pushed to the data store 22 using a mediator 24, also referred to as a mediation bridge (not separately numbered). The mediator 24 ensures that all the collected files are backed-up, archived, and distributed to the data store 22 and that the original files on the application server 20 are destroyed.

The data store 22 enriches the transaction records with subscriber profile information that is stored and maintained as master records for each of the subscribers (i.e., the first user). The enriched data sets are then made available to data consumers through an exposed application programming interface (API) layer to facilitate data viewing, interaction with the data sets and also data integrations to third-party applications.

The data store 22 also allows for the configuration of multiple compliance policies of which any one or more can be deployed against any line of business, logical group or individual subscriber (i.e., the first user). The system 10 uses an inheritance model to "inherit" compliance policies (or compliance business rules) and apply these against groups and subscribers, where such groups and subscribers may be assigned multiple compliance policies. This enables advanced configuration of the business rules (both for data recording and data viewing).

The data store 22 enriches the transaction records with subscriber profile information that is maintained as master records for the first user. The enriched data sets are then made available to data consumers through an exposed API layer to facilitate data viewing, interaction with the data sets and also data integrations to third party applications.

The data store 22 also allows for the configuration of multiple compliance policies of which any one or more can be deployed against any line of business, logical group or individual subscriber (i.e., the first user). The system 10 uses an inheritance model to "inherit" compliance policies (or compliance business rules) and apply these against groups and subscribers, where such groups and subscribers may be assigned multiple compliance policies. This enables advanced configuration of the business rules (both for data recording and data viewing).

Figure 2:
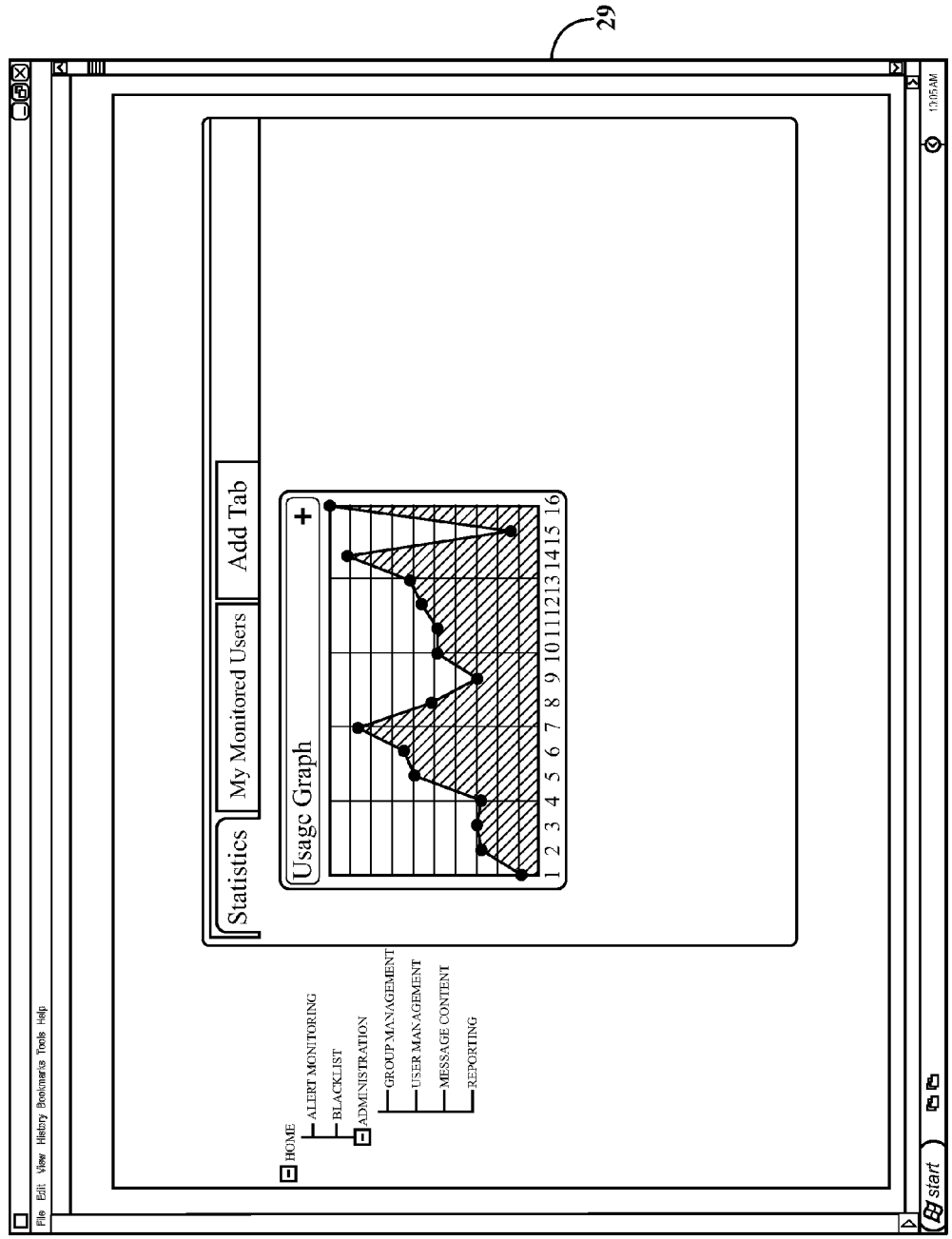
FIG. 2 is display view of a web browser showing a usage statistics graph for a first telecommunications device.
Figure 3:
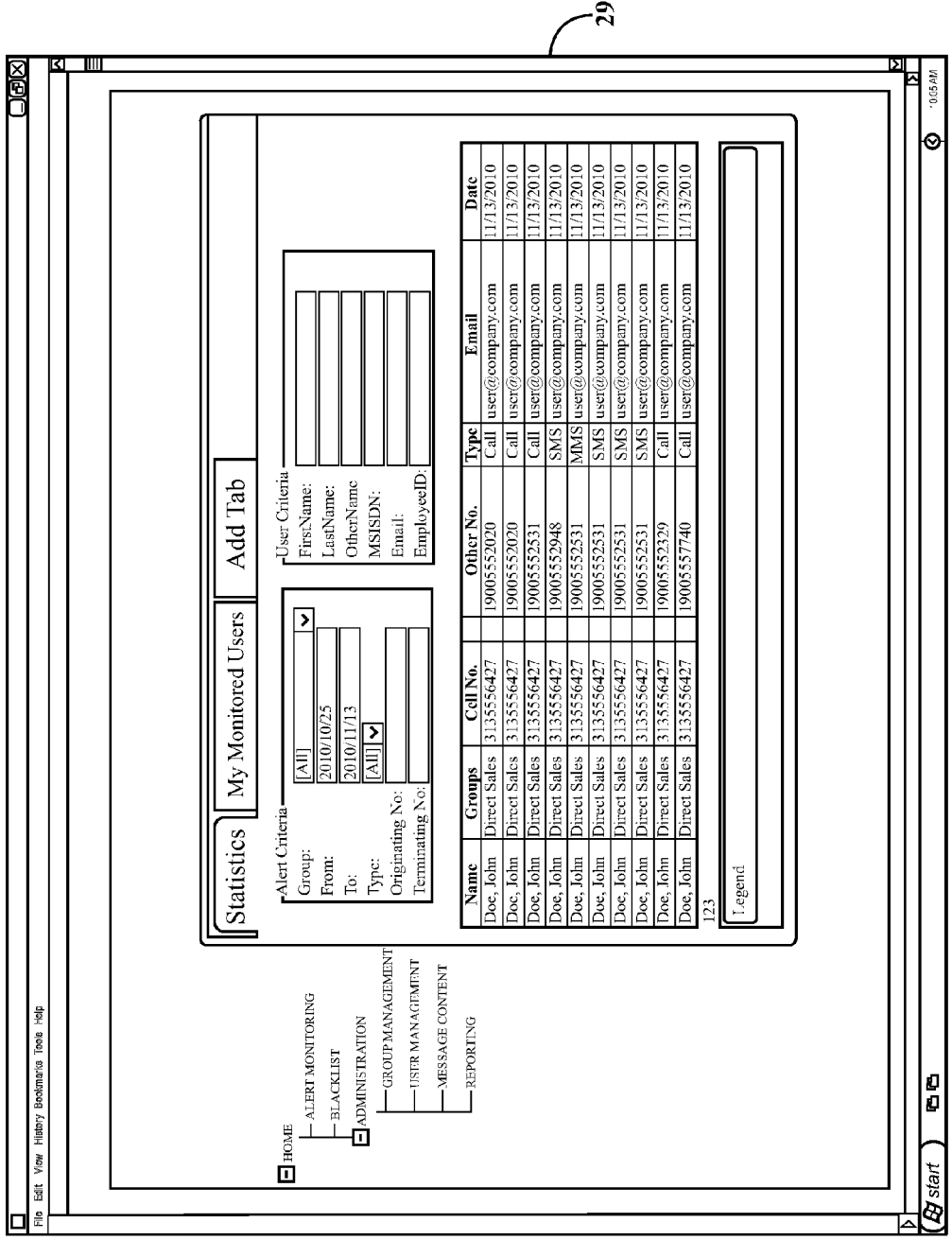
FIG. 3 is a display view of the web browser showing detailed usage logs for the first telecommunications device.

The system 10 includes at least one interface 25 for relaying the content of the data store 22 to a separate storage system 26, to a consumer (not numbered), or other applicable device (not shown). The content may be presented to the consumer in a plurality of forms using any number of techniques known to those skilled in the art. In one instance, the content may be presented via a computer 28. Specifically, a web browser 28 running on the computer 28, as shown in FIGS. 2 and 3. FIG. 2 shows a graph (not numbered) displaying usage of the first telecommunications device 12, while FIG. 3 shows a detailed listing of telephone calls made and text messages exchanged using the first telecommunications device 12.

Furthermore, the system 10 may store a list of persons and/or organizations to which the first user is not permitted to contact. For example, the list, e.g., a "black list", may include the phone numbers of business competitors, former employees, etc. An alert may be sent to a third party, e.g., the computer 28, when communication between the first telecommunications device 12 and a person and/or organizations on the list.

Also, the system 10 may provide a convenient display of all communications between the first telecommunications device 12 and other telecommunications devices, such as a person or organization on the list. For instance, the system 10 may display a timeline (not shown) of each individual communications which allows the consumer to see exactly what form of communication was utilized along with the content of each communication. In one example, the system 10 may display, on one "screen" of the computer 28, a phone call received on a first day of a month, a text message sent on a second day of a month, an email received on a third day of a month, and a data file transmitted on a fourth day of a month.

Referring again to FIG. 1, the system 10 preferably includes a plurality of firewalls 30*a*, 30*b*, 30*c* to prevent unauthorized or malicious transfer of data, i.e., "hacking", from the server computer 18. For instance, in the illustrated embodiment, a first firewall 30*a* is implemented between the first telecommunications device 12 and the application server 20 to prevent access of data from the first telecommunications device 12. Also in the illustrated embodiment, a second firewall 30*b* is implemented between the data store 22 and the separate storage system 26 and a third firewall 26*c* is implemented between the data store 22 and the consumers via the interface 24.

The method described below may utilize the system 10 illustrated herein and described above, or may utilize other suitable hardware and software solutions. Specifically, the method includes the step of receiving a request at the first telecommunications device 12 to initiate the communications between the parties. The request to initiate the communications may be implemented in numerous ways. The request may be made by receiving a character-based message from the second telecommunications device 16 at the first telecommunications device 12. As one example, the second user sends a text message to the first user. The request may also be made by receiving an audible conversation request from the second telecommunications device 16 at the first telecommunications device 12. As an example, the second user places a phone call to the first user. Furthermore, the request may be made by receiving an input from the first user at the first telecommunications device 12 to initiate communications with the second party 16. That is, the first user simply places a phone call or sends a text message to the second user by entering the phone number of the second user or by another selection process known to those skilled in the art.

The method continues with the step of receiving an identifier uniquely identifying the second party at the first telecommunications device 12. This identifier is typically the telephone number (or "phone number") of the second telecommunications device 16. However, the identifier may be any other suitable identifier, such as, but certainly not limited to, the International Mobile Equipment Identifier (IMEI) number, an electronic serial number (ESN), or a Subscriber Identity Module (SIM card) number.

The method includes automatically sending a warning message to the second party. This warning message preferably indicates that the communications are being recorded. That is, the second party is warned that anything that they say, send, text, hear, or otherwise transmit or receive may be recorded by a third party. Specifically, the warning message is sent to the second telecommunications device 16, such that it may be received by the second party.

The warning message may be a character-based message, an audible message, or implemented using another appropriate technique as known to those skilled in the art. In the illustrated embodiment, the warning message is sent as a character-based message when the request to initiate communication is by receipt of a character-based message at the first telecommunications device 12 or by sending a character-based message from the first telecommunications device 12. The character-based message may be stored on the first telecommunications device 12 and transmitted to the second transmission device, at least in part via the mobile phone network 14. Alternatively, the character-based message may be stored remotely from the first telecommunications device 12. For example, the character-based message may be stored by and sent from the server computer 18 to the second telecommunications device 16. Furthermore, the first user may be notified, e.g., with a character-based message, that the warning message has been sent to the second telecommunications device 16.

Also in the illustrated embodiment, the warning message is sent as an audible message when the request to initiate communication is by receiving an audible conversation request from the second telecommunications device 16 at the first telecommunications device 12 or by initiating an audible conversation request at the first telecommunications device 12 to the second telecommunications device 16. Said plainly, when a telephone call is received or is being sent, the warning message is an audible message, i.e., a voice message, that is played to the second telecommunications device 16 stating that all conversations utilizing the first telecommunications device 12 will be recorded. The audible message may be stored and sent by the first telecommunications device 12 to the second telecommunications device 16. Alternatively, the first and second telecommunications devices 12, 16 may be connected to a third entity (not separately numbered), such as the server computer 18, in a conference call fashion to play the audible message to the second user using the second telecommunications device 16. Of course, the first user, using the first telecommunications device 12, may also listen to the audible message based on the particular configuration of the system 10.

In one embodiment, the warning message is sent to the second telecommunications device 16 in response to receiving the identifier uniquely identifying the second telecommunications device 16. That is, the receipt of the identifier triggers the warning message to be sent. In another embodiment, the system 10 verifies whether or not a warning message has previously been sent to the second party, i.e., whether or not a warning message has already been sent to the second telecommunications device 16. If a warning message has not already been sent, then the warning message is sent; but if the warning message has already been sent, then the warning message need not be sent again. That is, the warning message is sent in response to determining that the second telecommunications device 16 has not previously been sent a warning message.

The conversations between the parties, i.e., the character-based messages and audible conversations, are recorded by the server computer 18 as described above. Specifically, in the illustrated embodiment, the first communication device 12 transmits data corresponding to the communications between the parties to the server computer 18 for collection by the application storage 20 and storage by the data store 22.

The system 10 may require confirmation of receipt of the warning message by the second party prior to recording of the conversation and in order to initiate recording of the conversation. Said another way, the warning message may include a request to confirm acceptance of the warning message. For example, the warning message may ask, "do you understand that your current conversation with this party may be recorded and future conversations may also be recorded?" When the warning message is sent via character-based message, the system 10 may request that a confirmation message be sent back to the first communications device 12 or other originator of the warning message. The confirmation message may be the word "Yes" or simply the letter "Y" Likewise, when the warning message is an audible message, the system 10 may request that the second party say the word "Yes" or press a specific number on a keypad (not shown) of the second telecommunications device 16.

The system 10 may also include a storage unit (not separately numbered) for storing the warning message to be sent to the second telecommunications device 16. The storage unit may be implemented as the processor of the first telecommunications device 12, the server computer 18, or other suitable component for storing data and/or audible messages.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A method of recording communications between a first party using a first telecommunications device and a second party utilizing a second telecommunications device and notifying the second party of the recording of the communications, said method comprising the steps of:
   receiving a request at the first telecommunications device to initiate the communications between the parties, wherein receiving the request includes receiving a character-based message from the second telecommunications device at the first telecommunications device;
   receiving an identifier uniquely identifying the second communications device at the first telecommunications device;
   automatically sending a warning message to the second communications device that the communications are being recorded in response to receiving the identifier uniquely identifying the second communications device and in response to determining that the second party had not previously been sent a warning message; and
   recording the communications between the first and second communications devices.

2. A method as set forth in claim 1 wherein said step of sending a warning message to the second party is further defined as sending a character-based message to the second telecommunications device stating that all messages sent to the first telecommunications device will be recorded.

3. A method as set forth in claim 1 wherein said step of receiving a request is further defined as receiving an audible conversation request from the second telecommunications device at the first telecommunications device.

4. A method as set forth in claim 3 wherein said step of sending a warning message to the second party is further defined as playing an audible message to the second telecommunications device stating that all conversations utilizing the first telecommunications device will be recorded.

5. A method as set forth in claim 1 wherein said step of receiving a request is further defined as receiving an input from the first user at the first telecommunications device to initiate communications with the second party.

6. A method as set forth in claim 1 wherein said step of recording the communications between the first and second parties is further defined as transmitting data corresponding to the communications between the parties from the first telecommunications device to a server computer.

7. A method as set forth in claim 1 wherein the warning message includes a request to confirm acceptance of the warning message.

8. A method as set forth in claim 7 further comprising the step of receiving an acknowledgement from the second telecommunications device that the warning message was received and/or is accepted.

9. A method as set forth in claim 8 wherein said step of recording the communications is further defined as recording the communications between the first and second communications devices in response to receiving the acknowledgement from the second telecommunications device.

* * * * *